United States Patent Office 2,795,571
Patented June 11, 1957

2,795,571

CATALYTIC PROCESS FOR POLYMERIZING TRIOXANE TO TOUGH, HIGH MOLECULAR WEIGHT POLYOXYMETHYLENE

Allan K. Schneider, Wilmington, Del., assignor to E. I. du Pont de Nemours and Company, Wilmington, Del., a corporation of Delaware No Drawing. Substituted for abandoned application Serial No. 390,715, November 6, 1953. This application April 17, 1956, Serial No. 578,588

13 Claims. (Cl. 260—67)

This invention relates to polymeric materials and more particularly to an improved method for preparing polyoxymethylene of superior quality.

Various acids and inorganic chlorides have been used in the past as catalysts for the depolymerization of trioxane to formaldehyde. In the absence of a formaldehyde acceptor, some of the monomeric formaldehyde formed undergoes polymerization to polyoxymethylene. However, the resulting polyoxymethylene is obtained in only very low yields and is brittle, and has poor thermal stability. The poor thermal stability of the polyoxymethylene obtained from trioxane by methods of the prior art prevents its use in certain applications, such as compression molding. Furthermore, the polyoxymethylene present in small proportions in trioxane due to spontaneous polymerization is brittle and therefore not useful for formation of films and fibers.

It is an object of this invention to provide a new process for the preparation of polyoxymethylene of superior quality in high yields from trioxane. A further object is to provide a new catalytic process for preparing tough, high molecular weight polyoxymethylene capable of being oriented and compression molded. Other objects will appear hereinafter.

The objects of this invention are accomplished by the following process which comprises polymerizing trioxane under anhydrous conditions and in contact with a catalyst consisting of selected inorganic fluorides. It has now been found that tough, high molecular weight polyoxymethylene capable of being oriented and compression molded can be produced from trioxane in high yields by the process of this invention.

The inorganic fluorides which are effective catalysts in the process of this invention are antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, and fluosulfonic acid. Of these inorganic fluorides the polyvalent metal fluorides, particularly the trivalent metal fluorides, are especially effective catalysts. Antimony trifluoride is preferred because it produces polyoxymethylene of the highest quality.

A preferred way of carrying out the process of this invention consists in charging a dry reaction vessel of glass, quartz, or corrosion-resistant metal, e. g., stainless steel, with trioxane and from 0.005 to 2%, based on the weight of trioxane, of one of the above-mentioned polyvalent metal fluorides as catalysts. From 0.5 to 1% of antimony trifluoride is especially effective. After charging, the reaction vessel is evacuated until there is an observable evaporation of trioxane, about one minute being sufficient with a vacuum of about 2 mm. of mercury. The reaction vessel is then closed and the trioxane allowed to polymerize at a temperature between room temperature and the temperature at which the polymer formed tends to depolymerize, i. e., between about 20° and 170° C. The reaction vessel is maintained at the desired temperature until the desired degree of polymerization takes place, the exact time depending on the particular catalyst and particular temperature being employed. In general, when polymerizations are carried out at the lower temperatures in the above-defined range, longer times are required than when the polymerizations are carried out at the higher temperatures. The toughest polymers are obtained at polymerization temperatures of 85–130° C.; consequently, this is the preferred range of polymerization temperature. Polymerization times ranging from 1 to 7 days give satisfactory results. However, longer or shorter times may be used if desired.

The polyoxymethylene forms in both the bottom and the top of the reaction vessel. That formed in the top apparently results from sublimation of the trioxane and is generally tougher and more stable to heat than that formed in the bottom of the reactor. The polymer formed in the bottom possesses a replica structure of the crystals of trioxane charged. The polyoxymethylene obtained is removed from the reactor and exposed to a current of air at room temperature or at moderately elevated temperature, e. g., 50° C., to remove any excess trioxane by evaporation. This is accomplished in 48 hours at room temperature or in a shorter time at higher temperature.

When trioxane is polymerized with hydrogen fluoride or fluosulfonic acid as catalyst, it is necessary to use an amount of catalyst less than about 0.5% of the weight of the trioxane in order to obtain the desired polyoxymethylene. If larger proportions of these particular catalysts are used, the trioxane is converted to methyl formate instead of the desired polymer. With these particular catalysts, amounts ranging from 0.005 to 0.5% of the weight of the trioxane are operable while proportions of 0.02 to 0.2% are preferred.

When the polymerization of trioxane is carried out in the presence of a gaseous catalyst, e. g., hydrogen fluoride, the reactor is conveniently charged with trioxane, evacuated and then the desired amount of catalyst is introduced. The polymerization is then carried out in the same manner as when a solid, inorganic fluoride is used as catalyst and the polymer is isolated and purified in the customary manner.

The reaction system must be free of water since the presence of water prevents the formation of the tough, high molecular weight polyoxymethylene capable of being compression molded. As little as 1% (based on weight of trioxane) of water added to a polymerization system capable of giving high molecular weight, tough polyoxymethylene (1% antimony trifluoride catalyst at 125° C.) gives high yields of brittle, low molecular weight polymer. Consequently, it is necessary for the reaction system to be anhydrous to obtain the best results.

This invention is illustrated further by the following examples in which the proportions of ingredients are expressed in parts by weight unless otherwise noted.

Example I

| | Parts |
|---|---|
| Trioxane (purified by recrystallization from methylene chloride) | 1.5 |
| Antimony trifluoride | 0.0015 |

The above ingredients are charged into a glass tube which is then evacuated and sealed under vacuum. The tube is heated in an oven for 72 hours at 125° C. After cooling, the tube is opened and there is obtained as the product a white friable solid polymer. This polyoxymethylene is pressed under 1000 lb./sq. in. pressure at 170–190° C. into a translucent, glossy, tough film. Strips of this film drawn at room temperature neck down very sharply and become highly oriented. The film is unaffected by boiling in water for five minutes and shows only very slight loss in weight when heated for 24 hours in air at 105° C.

Example II

| | Parts |
|---|---|
| Trioxane | 50.0 |
| Antimony trifluoride | 0.5 |

The above ingredients are heated in an evacuated and sealed glass tube for 24 hours at 130° C. There is obtained 50 parts of white solid polyoxymethylene which, when pressed under 1000 lb./sq. in. pressure at 190° C., gives a tough, translucent film. This film is oriented to a high degree by drawing. When heated in air at 105° C., this polyoxymethylene film loses only 0.69% in weight in 1 day and only 5.6% in 10 days.

Example III

| | Parts |
|---|---|
| Trioxane | 10.0 |
| Antimony trifluoride | 0.20 |

The above ingredients are heated in a sealed, evacuated glass tube for 120 hours at 85° C. After cooling, the tube is opened by cutting in the middle in order to isolate separately the polymer formed in the bottom and in the top of the tube. There is obtained from the bottom of the tube 4.43 parts of white polymer and from the top of the tube there is obtained 5.27 parts of white polymer. Both of these polyoxymethylenes give tough, translucent films when molded under 1000 lb./sq. in. pressure at 190° C. These films are also oriented by cold drawing.

Example IV

| | Parts |
|---|---|
| Trioxane | 10.0 |
| Bismuth trifluoride | 0.05 |

The above ingredients are heated in a sealed, evacuated glass tube for 43 hours at 125° C. After cooling, the tube is opened by cutting in the middle and the polymer formed in the top and bottom of the tube removed separately. After air drying for 48 hours, there is obtained 1.29 parts of white polymer from the bottom of the tube and 0.57 part of white polymer from the top of the tube. This latter polyoxymethylene is pressed under 1000 lb./sq. in. pressure at 190° C. into a tough, translucent film which is orientable by drawing.

Example V

| | Parts |
|---|---|
| Trioxane | 10.0 |
| Bismuth oxyfluoride | 0.1 |

The above ingredients are heated in a sealed, evacuated glass tube for 48 hours at 125° C. After cooling, the tube is opened by cutting in the middle and the portions of the polymer in the top and bottom of the tube isolated separately. After air drying for 48 hours, the polyoxymethylene from the bottom of the tube amounts to 0.31 part and that from the top of the tube amounts to 0.95 part. The latter polyoxymethylene is molded under 1000 lb./sq. in. pressure at 190° C. into a tough, translucent film which is orientable by cold drawing.

Example VI

| | Parts |
|---|---|
| Trioxane | 10.0 |
| Hydrogen fluoride | 0.0228 |

The trioxane is charged into a glass tube, the tube evacuated and the hydrogen fluoride then introduced. The tube is sealed and heated in an oven for 48 hours at 125° C. After cooling, the tube is opened by cutting in the middle and there is isolated separately the polymer in the upper and lower parts. After air drying for 48 hours, there is obtained 0.98 part of white polyoxymethylene from the bottom of the tube and 8.75 parts of white polyoxymethylene from the top of the tube. Both fractions of polyoxymethylene are molded under 1000 lb./sq. in. pressure at 190° C. into tough, translucent films. These films are also orientable by cold drawing.

Example VII

| | Parts |
|---|---|
| Trioxane | 10.0 |
| Nickelous fluoride | 0.05 |

The above ingredients are heated in a sealed, evacuated glass tube for 43 hours at 125° C. There is obtained by the procedure used in the preceding examples 0.18 part of greenish powder from the bottom of the tube and 9.38 parts of tough, solid polyoxymethylene from the top of the tube.

Example VIII

| | Parts |
|---|---|
| Trioxane | 10.0 |
| Aluminum trifluoride | 0.05 |

The above ingredients are heated in an evacuated and sealed glass tube for 43 hours at 125° C. There is obtained by the procedure used in the preceding examples a trace of white polymer powder from the bottom of the tube and 9.16 parts of tough, solid white polyoxymethylene from the top of the tube.

Example IX

| | Parts |
|---|---|
| Trioxane | 10.0 |
| Fluosulfonic acid | 0.01 |

The above ingredients are heated in an evacuated and sealed glass tube for 48 hours at 125° C. There is obtained 9.98 parts of tough, solid white polyoxymethylene, all of which is formed in the top of the tube.

Example X

| | Parts |
|---|---|
| Trioxane | 10.0 |
| Phosphorus pentafluoride | 0.013 |

The above ingredients are charged into a dry, evacuated glass container. The container is sealed and stored at room temperature. Within 18 hours there is an extensive deposit of white polymer. After a total of 5 days at room temperature, the container is opened and excess trioxane and phosphorus pentafluoride are removed by volatilization. There is obtained 0.67 part of solid, white polyoxymethylene.

Example XI

| | Parts |
|---|---|
| Trioxane | 10.0 |
| Antimony trifluoride | 0.1 |

The above ingredients are placed in a stainless steel tube fitted with a valve. The charged tube is evacuated, the valve closed, and the tube heated in an oven at 125° C. for 48 hours. After cooling, the tube is opened and the polymer is removed and air-dried for 24 hours. There is obtained 9.33 parts of tough, hard, white polyoxymethylene.

Example XII

| | Parts |
|---|---|
| Trioxane | 10.0 |
| Antimony fluoborate | 0.1 |

The above ingredients are heated in an evacuated and sealed glass tube for 64 hours at 125° C. There is obtained 9.67 parts of tough, solid, white polyoxymethylene from the top of the tube.

Example XIII

| | Parts |
|---|---|
| Trioxane | 10.0 |
| Titanium tetrafluoride | 0.1 |

The above ingredients are heated in an evacuated and sealed glass tube for 48 hours at 125° C. There is obtained 0.35 part of solid, tough, white polyoxymethylene from the top of the tube and 7.81 parts of solid, tough, white polyoxymethylene from the bottom of the tube.

Example XIV

| | Parts |
|---|---|
| Trioxane | 10.0 |
| Manganous fluoride | 0.1 |

The above ingredients are heated in an evacuated and sealed glass tube for 48 hours at 125° C. There is obtained 1.24 parts of tough, solid, white polyoxymethylene from the bottom of the tube and 5.86 parts of tough, solid, white polyoxymethylene from the top of the tube. The latter polyoxymethylene is molded under 1000 lb./sq. in. pressure at 190° C. into a tough, translucent film which is orientable by cold drawing.

Example XV

| | Parts |
|---|---|
| Trioxane | 10.0 |
| Manganic fluoride | 0.1 |

The above ingredients are heated in an evacuated and sealed glass tube for 64 hours at 125° C. There is obtained 9.97 parts of tough, solid, white polyoxymethylene from the top of the tube.

Example XVI

| | Parts |
|---|---|
| Trioxane | 10.0 |
| Mercuric fluoride | 0.1 |

The above ingredients are heated in an evacuated and sealed glass tube for 64 hours at 125° C. There is obtained 10.0 parts of tough, solid, white polyoxymethylene from the top of the tube.

Example XVII

| | Parts |
|---|---|
| Trioxane | 10.0 |
| Silver fluoride | 0.1 |

The above ingredients are heated in an evacuated and sealed glass tube for 64 hours at 125° C. There is obtained 9.89 parts of tough, solid, white polyoxymethylene from the top of the tube.

Example XVIII

| | Parts |
|---|---|
| Trioxane | 10.0 |
| Zinc fluoride | 0.1 |

The above ingredients are heated in an evacuated and sealed glass tube for 48 hours at 125° C. There is obtained 9.67 g. of tough, solid, white polyoxymethylene from the top of the tube.

Example XIX

| | Parts |
|---|---|
| Trioxane | 25.0 |
| Ammonium bifluoride | 0.25 |

The above ingredients are heated in an evacuated and sealed glass tube for 41 hours at 125° C. There is obtained 1.0 part of solid, tough, white polyoxymethylene from the top of the tube.

Example XX

| | Parts |
|---|---|
| Trioxane | 10.0 |
| Hydrogen fluoride | approximately 0.001 |

The above ingredients are heated in a sealed, evacuated glass tube for 20 hours at 130° C. There is thus obtained a white solid polyoxymethylene which can be pressed into films at 190° C.

Commercially available trioxane, free of moisture, can be used in the process of this invention. However, best results are obtained with trioxane purified by recrystallization or by distillation. Good results are obtained by recrystallizing commercial trioxane from petroleum ether. A convenient way of carrying out the recrystallization consists in placing the trioxane to be purified in the thimble of a Soxhlet extractor and extracting it with petroleum ether. Trioxane soon begins to crystallize from the petroleum ether in the pot of the extractor, but it is possible to continue extraction until substantially all the trioxane is removed from the thimble. The entire extraction liquor plus the precipitated trioxane is cooled to 0° C. and the mother liquor thoroughly drained from the crystals. The crystals of trioxane are freed of solvent by placing them in a desiccator over a dehydrating agent and then alternately evacuating and filling the desiccator with oxygen-free nitrogen. For purifying trioxane by distillation it is preferred to employ stainless steel equipment and to conduct the fractionation in the absence of oxygen or extraneous moisture.

The effectiveness of the particular catalysts described herein for the polymerization of trioxane to high molecular weight, tough polyoxymethylenes is quite unexpected in view of the inoperability of many closely related inorganic compounds, both fluorides and other metal salts. More specifically, antimony and stannous chloride, sodium fluoride, potassium fluoride, lithium fluoride, calcium fluoride, magnesium fluoride, barium fluoride, strontium fluoride, lead fluoride, ferric fluoride, and ammonium fluoride show no catalytic activity. Furthermore, the catalysts used in the process of this invention are not satisfactory for the polymerization of monomeric formaldehyde. For example, antimony trifluoride, the preferred catalyst in the process of this invention, added to an ether solution of monomeric formaldehyde is ineffective as a polymerization catalyst in such a system.

The polyoxymethylenes produced by the process of this invention possess a very high molecular weight, have good thermal stability, are orientable by drawing and are useful in many applications. More particularly, the good thermal stability of these polyoxymethylenes, which is illustrated by their low loss in weight on heating, i. e., as little as 2.5% loss in 10 days at 105° C., makes them useful in the form of molded and extruded objects. The hitherto known polyoxymethylenes from trioxane cannot be molded or extruded without substantially complete decomposition.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing tough, high molecular weight polyoxymethylene capable of being oriented and molded, which comprises polymerizing trioxane as the sole reactant, under anhydrous conditions at a temperature between room temperature and 170° C., and in contact with a catalyst consisting of an inorganic fluoride selected from the class consisting of antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, and fluosulfonic acid.

2. A process for preparing tough, high molecular weight polyoxymethylene capable of being oriented and molded, which comprises polymerizing trioxane as the sole reactant, under anhydrous conditions at a temperature between 85° and 130° C., and in contact with a catalyst consisting of an inorganic fluoride selected from the class consisting of antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, and fluosulfonic acid, said inorganic fluoride being not more than 2% by weight of said trioxane, being from 0.005 to 0.5% by weight of the trioxane for hydrogen fluoride and for fluosulfonic acid and being from 0.005 to 2% by weight of the trioxane for the remainder of said inorganic fluorides.

3. A process for preparing tough, high molecular weight polyoxymethylene capable of being oriented and molded, which comprises polymerizing trioxane as the sole reactant, under anhydrous conditions at a temperature between room temperature and 170° C., and in contact with a catalyst consisting of antimony trifluoride.

4. A process for preparing tough, high molecular weight polyoxymethylene capable of being oriented and molded, which comprises polymerizing trioxane as the sole reactant, under anhydrous conditions at a temperature between 85° and 130° C., and in contact with a catalyst consisting of from 0.005 to 2% of antimony trifluoride by weight of said trioxane.

5. A process as set forth in claim 4 wherein said antimony trifluoride is from 0.5 to 1% by weight of said trioxane.

6. A process for preparing tough, high molecular weight polyoxymethylene capable of being oriented and molded, which comprises polymerizing trioxane as the sole reactant, under anhydrous conditions at a temperature between room temperature and 170° C., and in contact with a catalyst consisting of bismuth trifluoride.

7. A process for preparing tough, high molecular weight polyoxymethylene capable of being oriented and molded, which comprises polymerizing trioxane as the sole reactant, under anhydrous conditions at a temperature between 85° and 130° C., and in contact with a catalyst consisting of from 0.005 to 2% of bismuth trifluoride by weight of said trioxane.

8. A process for preparing tough, high molecular weight polyoxymethylene capable of being oriented and molded, which comprises polymerizing trioxane as the sole reactant, under anhydrous conditions at a temperature between room temperature and 170° C., and in contact with a catalyst consisting of bismuth oxyfluoride.

9. A process for preparing tough, high molecular weight polyoxymethylene capable of being oriented and molded, which comprises polymerizing trioxane as the sole reactant, under anhydrous conditions at a temperature between 85° and 130° C., and in contact with a catalyst consisting of from 0.005 to 2% of bismuth oxyfluoride by weight of said trioxane.

10. A process for preparing tough, high molecular weight polyoxymethylene capable of being oriented and molded, which comprises polymerizing trioxane as the sole reactant, under anhydrous conditions at a temperature between room temperature and 170° C., and in contact with a catalyst consisting of ammonium bifluoride.

11. A process for preparing tough, high molecular weight polyoxymethylene capable of being oriented and molded, which comprises polymerizing trioxane as the sole reactant, under anhydrous conditions at a temperature between 85° and 130° C., and in contact with a catalyst consisting of from 0.005 to 2% of ammonium bifluoride by weight of said trioxane.

12. A process for preparing tough, high molecular weight polyoxymethylene capable of being oriented and molded, which comprises polymerizing trioxane as the sole reactant, under anhydrous conditions at a temperature between room temperature and 170° C., and in contact with a catalyst consisting of from 0.005 to 0.5% of hydrogen fluoride by weight of said trioxane.

13. A process for preparing tough, high molecular weight polyoxymethylene capable of being oriented and molded, which comprises polymerizing trioxane as the sole reactant, under anhydrous conditions at a temperature between 85° and 130° C. and in contact with a catalyst consisting of from 0.02 to 0.2% of hydrogen fluoride by weight of said trioxane.

References Cited in the file of this patent

UNITED STATES PATENTS

| | | |
|---|---|---|
| 2,122,826 | Van Peski | July 5, 1938 |
| 2,270,135 | Mikeska | Jan. 13, 1942 |
| 2,274,749 | Smyers | Mar. 3, 1942 |
| 2,304,431 | Walker | Dec. 8, 1942 |
| 2,477,538 | Badertescher | July 26, 1949 |

OTHER REFERENCES

Walker: Formaldehyde, Reinhold, 1944, pp. 98 and 99. (Copy in Science Library.)